April 22, 1969
L. D. KEEGAN
3,439,765
POWER TRANSFER MEANS FOR CONNECTING DRIVEN
AND UNDRIVEN WHEELS OF VEHICLES
Filed March 10, 1967
Sheet 1 of 2
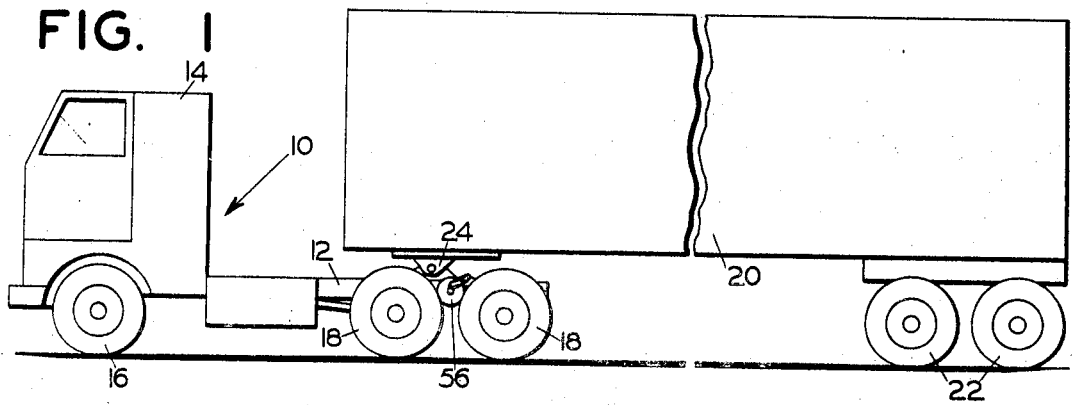
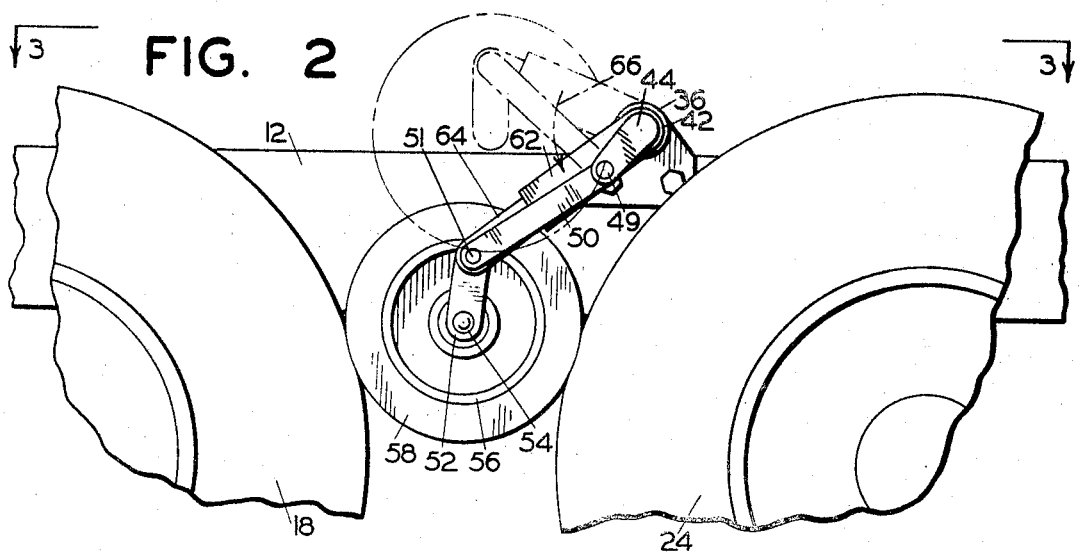
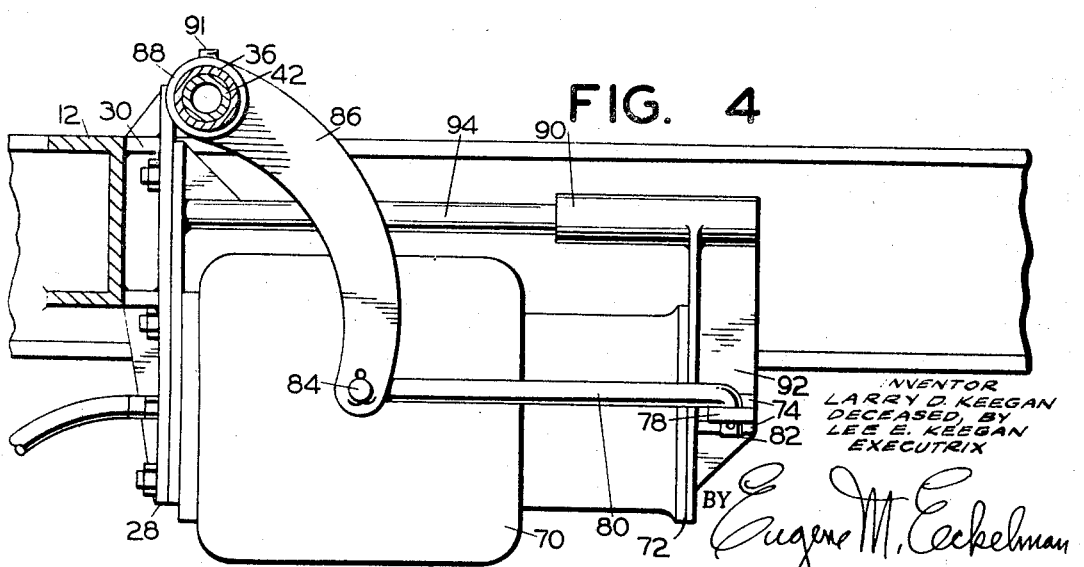
INVENTOR
LARRY D. KEEGAN
DECEASED, BY
LEE E. KEEGAN
EXECUTRIX
BY Eugene M. Eckelman
ATTORNEY

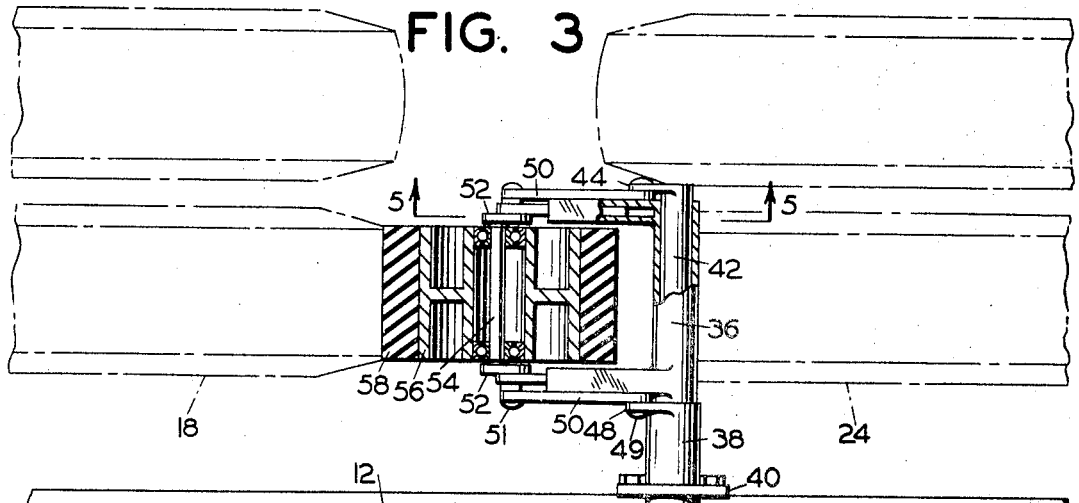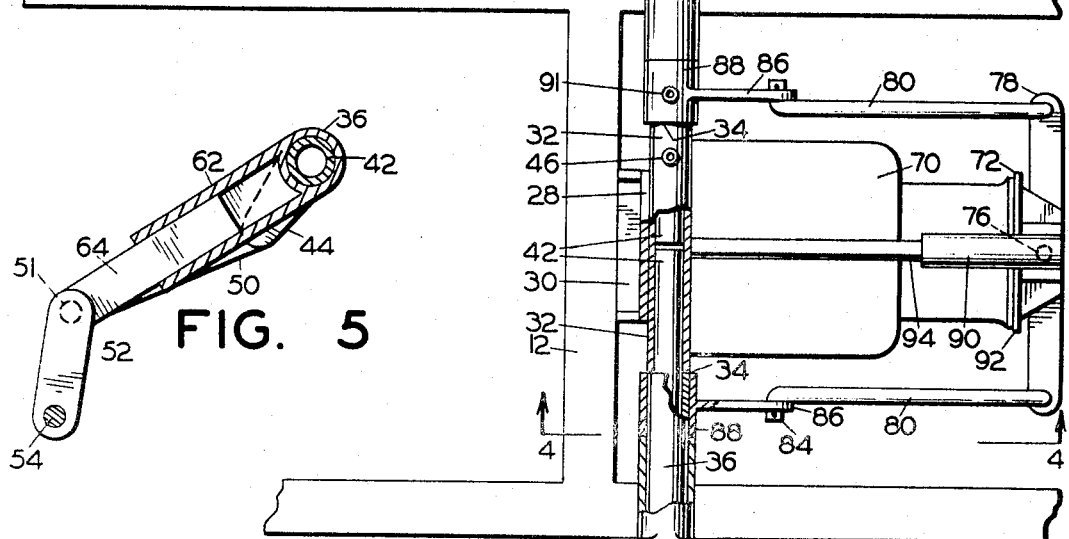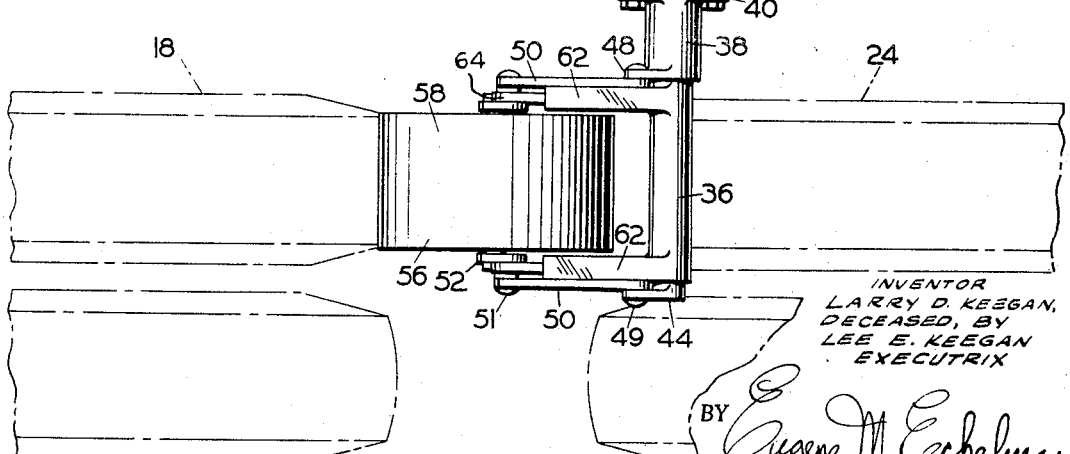

United States Patent Office 3,439,765
Patented Apr. 22, 1969

3,439,765
POWER TRANSFER MEANS FOR CONNECTING DRIVEN AND UNDRIVEN WHEELS OF VEHICLES
Larry D. Keegan, deceased, late of Clackamas, Oreg., by Lee E. Keegan, executrix, Rte. 1, Box 131C, Pendleton, Oreg. 97801
Filed Mar. 10, 1967, Ser. No. 623,796
Int. Cl. B62d 61/10; B60k 17/00
U.S. Cl. 180—22                                          4 Claims

ABSTRACT OF THE DISCLOSURE

A cross shaft is driven rotatably by power drive means and carries a friction wheel arranged upon driven rotation of the shaft to frictionally connect a driven wheel with an undriven wheel. Connection of the friction wheel with the shift is accomplished by a lever arm which is extendable so that such friction wheel is positionable between the driven and undriven wheels by pivotal movement with the shaft in addition to extending movement of the arm. The arm has a pair of telescopically extendable members, and also provided in the connection are link means pivotally connected at one of its ends to the outer end of the arm, means rotatably supporting the friction wheel on the other end of the link means, and second link means pivotally connected between the shaft and the arm, with one of the arm members being connected to the shaft and the other of the arm members being connected to the second link means, for limiting the extension thereof.

---

This invention relates to a power transfer means for connecting driven and undriven wheels of vehicles.

Many hauling vehicles such as trucks have tandem axle arrangements including a driven or live axle and an undriven or dead axle. In one type of truck construction, there are rear tandem axles forming an integral part of the truck and in another type of construction there is one driven axle, which is integral with the truck, and a connecting structure such as a fifth wheel for detachably securing a dolly or trailer thereto having an undriven axle which forms with the driven axle of the vehicle a tandem axle assembly. In the types of vehicles mentioned, the drive wheels alone may not have the desired traction when the truck is on a wet or otherwise slippery surface, it is a primary objective of the present invention to provide new and useful improvements in power transfer means for connecting the drive and undriven wheels of the vehicle whereby to increase traction on the road surface.

Another object is to provide power transfer means of the type described which is compact in structure and capable of mounting on existing trucks without materially altering truck structure.

Another object is to provide power transfer means of the type described which is simplified in construction, light in weight, and rugged in use.

More particular objects are to provide power transfer mechanism for connecting driven and undriven wheels of vehicles which has power means connected to oppositely extending lateral shaft members carrying friction wheel supporting assemblies upon rotation of the shaft members of forcing friction wheels thereon downwardly into engagement with the peripheral edge surface of driven and undriven wheels; which has a novel friction wheel mounting assembly serving to position the friction wheels into uniform bearing engagement between the driven and undriven wheels; and which employs a pair of friction wheels for engaging respective wheels on opposite sides of the vehicle.

Additional objects and advantages will become apparent from the following description taken in connection with the accompanying drawings which illustrate a preferred form of the device.

In the drawings:

FIGURE 1 is a side elevational view of one form of vehicle with which the present power transfer means may be associated and showing the latter installed thereon;

FIGURE 2 is a side elevational view, enlarged relative to FIGURE 1, showing the rear wheel assembly of FIGURE 1 and illustrating with greater particularity the present power transfer means as connected thereto;

FIGURE 3 is a top plan view of the present power transfer means mounted on a vehicle, this view being taken on the line 3—3 of FIGURE 2 and being partly broken away and in section for clarity;

FIGURE 4 is an enlarged, vertical sectional view taken on the line 4—4 of FIGURE 3 and illustrating in particular drive structure for operating the present power transfer device; and FIGURE 5 is an enlarged, fragmentary sectional view taken on the line 5—5 of FIGURE 3.

Referring first to FIGURE 1, there is shown one type of vehicle 10 with which the present mechanism may be associated. Such a vehicle has a frame 12, an operator's compartment 14, front wheels 16, and rear wheels 18. This vehicle comprises a tractor for pulling a trailer 20 supported at its rearward end by tandem dual wheels 22 and at its forward end by a fifth wheel 24 on the tractor. In some instances, the back set of wheels 18 will be a part of the tractor, as shown, or such wheels may comprise a part of a dolly or third axle structure having conventional means, not shown, adapted for removable connection to the tractor 10. In such tractor constructions, the forwardmost rear wheels 18 are driven and the trailing rear wheels are undriven.

It is to be understood that the present power transfer means is capable of use on other types of vehicles and more specifically can be used on any type of vehicle wherein undriven wheels track behind and are closely associated with driven wheels, the purpose of the invention being to connect the undriven wheels to the driven wheels by means of friction wheels engaging the peripheral surfaces of the vehicle wheels.

The invention comprises an upright mounting plate 28, FIGURES 3 and 4, which is secured to the frame 12 by suitable bracket means 30. Such securement to the frame is accomplished by welding or by any other suitable means. It is to be understood that if a portion of the frame 12 does not extend in precisely in the right position, mounting plate 28 can be secured on bracket arms which are suitably shaped and suitably secured to the frame of the vehicle.

Integrated with the mounting plate 28 is a transversely disposed support tube 32. This tube 32 comprises only a short segment, the ends thereof being designated by the numerals 34 in FIGURE 3. Abutting against the ends of the support tube 32 are the ends of oppositely projecting tubular shafts 36 which are journaled in tubular segments 38 having a flanged portion 40 by means of which the said tubular segments are integrated with the frame of the vehicle. In connection with the present description it is to be understood that the assemblies which project in opposite directions from the support tube 32 are of identical construction.

The shafts 36 project outwardly beyond the outer ends of the supporting tube segments 38, and extending through these shafts are core members such as tubes or bars 42. The inner ends of these core members terminate adjacent to the central portion of the assembly and the outer ends thereof project from the ends of the shafts 36 and have integral ears 44, the purpose of which will be described in greater detail hereinafter. The core members 42 are secured non-rotatably to the support tube 32 by set screws 46 or the like. In the structure thus far described, it is apparent that the support tube 32 and core members 42 are held in a fixed, nonrotative position, and the shafts 36 are rotatably journaled in the tube segments 38 and on the core members 42.

The outer ends of tube segments 38 have an ear 48, and these ears project in the same direction and cooperate with respective ears 44 on the outer ends of core members 42 to form aligned pivot supports, by means of pivot pins 49, for a pairs of side links 50, also seen in FIGURE 2. Links 50 have a pivotal connection at their other ends, by means of pivot pins 51, to one end of extension links 52, and such extension links support cross shafts 54 at their other ends. Mounted on the shafts 54 are freely rolling wheels 56 having a tire or friction surface 58. Such friction wheels are of a diameter greater than the normal spacing between the sets of wheels 18 of the vehicle whereby upon moving such friction wheels to a position of forced engagement with the vehicle wheels a drive connection is provided between such vehicle wheels.

Integrated with the shafts 36 at the outer projecting ends thereof are pairs of arms 62 which as best shown in FIGURE 5 have an open front, hollow construction for receiving extension arms 64. Arms 64 are slidably engaged in the arms 62 and the projecting ends thereof have a pivotal attachments to the pivot pins 51 between the links 50 and 52.

By the present arrangement it is apparent that upon rotation of the shafts 36 in a counter-clockwise direction, as viewed in FIGURE 2 and as designated by the arrow 66, the friction wheels are forced downwardly from an inoperative freely hanging position shown in phantom lines in FIGURE 2 to an operative position in engagement with pairs of the vehicle wheels 18, shown in full lines in FIGURE 2. In view of the fact that the links 50 have pivotal movement on the ears 44 and 48, the friction wheels 56 have a large area of adjustment to seek their wedging operative engagement with the two vehicle wheels. More particularly, when the friction wheel assemblies are moved downwardly from their inoperative position toward a wheel engaging position by rotation of the shafts 36 and integrated arms 62, the links 50 will first straighten relative to the ears 44, and as the friction wheels come into engagement with the vehicle wheels the links 50 and 52 will adjust angularly to force the said wheels into a uniform bearing engagement with both wheels. A large radius of operative function is achieved by the linkage support arrangement of the friction wheels in that such wheels are adjustable on an arc having substantially the combined length of the links 50 and 52 as its radius. As the distance of the friction wheel axes from their supporting points on the ears 44 and 48 changes, the extension arms 64 automatically adjust themselves slidably in the hollow arms 62. In a preferred construction, the links 52 terminate substantially at or short of the rim of the wheels 56. Such structure allows ample adjustment of the friction wheels between the wheels 18 and at the same time provides a compact structure in order that the assembly when raised to its inoperative position will take up a minimum of space.

The long radius adjustment of the friction wheels 56 facilitates convenient attachment to existing vehicles since precise placement of the assembly is not necessary. That is, in some instance the closest operating positioning of the friction wheels with relation to the vehicle wheels cannot be accomplished because of existing frame members, springs, power mechanisms, or the like, and with the present invention the assembly need only be sufficiently close such that the linkage arrangement will accomplish proper engagement of the friction wheels with the vehicle wheels.

Powered rotation of the shafts 36 is accomplished by a conventional air bag assembly 70 secured at one of its ends to the mounting plate 28. The outer end of the air bag assembly has a head 72 provided with a pair of horizontally disposed parallel plates 74 between which is pivotally mounted, as by pivot pins 76, an equilizer bar 78.

Attached to the outer ends of the equalizer bar 78 are rod members 80 having angular portions 82 at one end thereof, FIGURE 4, for connection to the equalizer bar 78 and also having angular portions 84 at the other end for connection to the ends of arms 86 having end sleeves 88 mounted on the inner ends of shafts 36 and having a drive connection with such shafts by set screws 90 or the like, FIGURE 3. Thus, as apparent in FIGURE 4, upon inflation of the air bag assembly 70 the arms 86 are rotated in a counter-clockwise direction to drive the shafts 36 in the same direction and move the friction wheels 56 downwardly into engagement with the vehicle wheels. Upon deactivation of the air bag assembly the arms 86 rotate clockwise to their original starting position and the friction wheels in such movement raise to their inoperative position, the air bag assembly being returned to its normal or rest position by suitable spring means therein which comprise conventional construction and therefore are not shown. It is to be understood that the power means 70 may take other forms such as one or more fluid cylinders.

Since the equalizer bar 78 has a pivotal connection with the head 72 of the air bag assembly, it can pivot to allow adjustable engagement of the friction wheels with the respective set of vehicle wheels. That is, the sets of wheels 18 on conventional vehicles are individually suspended to accomplish uniform support of the vehicle on a road surface, and as the sets of wheels 18 adjust with relation to one another the friction wheels 56 automatically adjust and maintain a uniform engagement with the surface of the tires.

Guided longitudinal movement of the head 72 of the air bag assembly is accomplished by a guide sleeve 90, FIGURES 3 and 4, integrated with said head, as by means of an upstanding bracket arm 92, slidably receiving a longitudinally extending rod 94 integrated with the mounting plate 28.

The present invention thus provides a power transfer means for connecting driven and undriven wheels such that the truck will have increased traction either in driving or braking operations. The parts of the invention are simplified in construction and compact in their arrangement so that they can be readily installed on existing vehicle structures with little or no alteration of the latter and without interfering with the operation thereof. The friction wheels are arranged for engagement with the inwardly disposed wheels of each set of duals in order that tire chains can be applied to the outer duals if desired. The application of power to the friction wheels by means of the inflatable air bag assembly 70 as well as the adjusting feature of the friction wheels by means of the pivotal equalizer bar 78, causes a smooth support by the vehicle and eliminates any axial bounce.

What is claimed is:

1. A mechanism for connecting an undriven wheel to a driven wheel on a vehicle wherein the undriven wheel is disposed in edge aligned relation to the driven wheel, comprising: a shaft member arranged for extending transversely of a vehicle in the mounted position thereof, a friction wheel, means connecting said friction wheel to said shaft member, said shaft member being arranged to support said friction wheel in edge surface alignment with the vehicle wheels and upon rotative movement thereof to cause said friction wheel to have simultaneous frictional, surface rolling engagement with the vehicle driven and undriven wheels for transferring a driving connection from the driven wheel to the undriven wheel, power operated means connected with said support means for rotating the same into engagement with the vehicle wheels, means connected between said shaft member and said power operated means for producing rotation of said shaft member upon operation of said power operated means, said means connecting the friction wheel to said shaft member comprising an extendable arm whereby said friction wheel is positionable between the driven and undriven wheels by pivotal movement with said shaft member in addition to extending movement of said arm.

2. The mechanism of claim 1 wherein said extendable arm has an outer end, and including link means pivotally connected at one of its ends to the outer end of said arm and means rotatably supporting said friction wheel on the other end of said link means.

3. The mechanism of claim 1 wherein said arm includes a pair of telescopically extendable members, and including link means pivotally connected between said support means and said arm, one of said arm members being connected to the shaft and the other of said arm members being connected to said link means for limiting the extension thereof.

4. The mechanism of claim 1 wherein said arm includes a pair of telescopically extendable members, and including first link means pivotally connected at one of its ends to the outer end of said arm, means rotatably supporting said friction wheel on the other end of said first link means, and second link means pivotally connected between said support means and said arm, one of said arm members being connected to the shaft and the other of said arm members being connected to said link means for limiting the extension thereof.

References Cited

UNITED STATES PATENTS 2,712,856 7/1955 MacPhee.
3,347,332 10/1967 Thompson.

A. HARRY LEVY, *Primary Examiner.*

U.S. Cl. X.R.

180—74